Aug. 28, 1928.

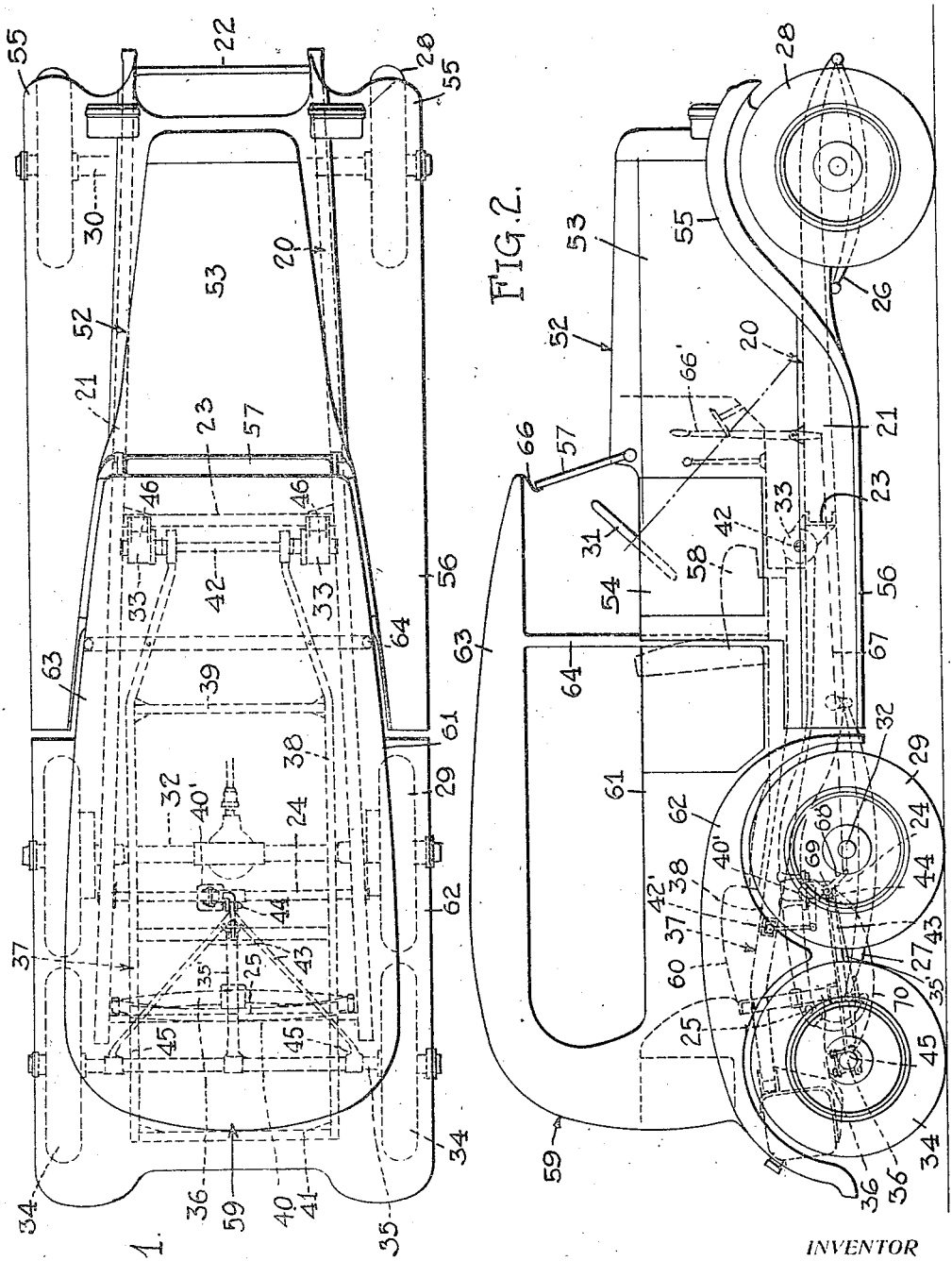

G. H. CURTISS 1,682,324

AUTOMOTIVE VEHICLE

Filed Aug. 8, 1925   3 Sheets-Sheet 2

INVENTOR
GLENN H. CURTISS.
BY W. Staer Jr
ATTORNEY

Aug. 28, 1928.
G. H. CURTISS
1,682,324
AUTOMOTIVE VEHICLE
Filed Aug. 8, 1925   3 Sheets-Sheet 3
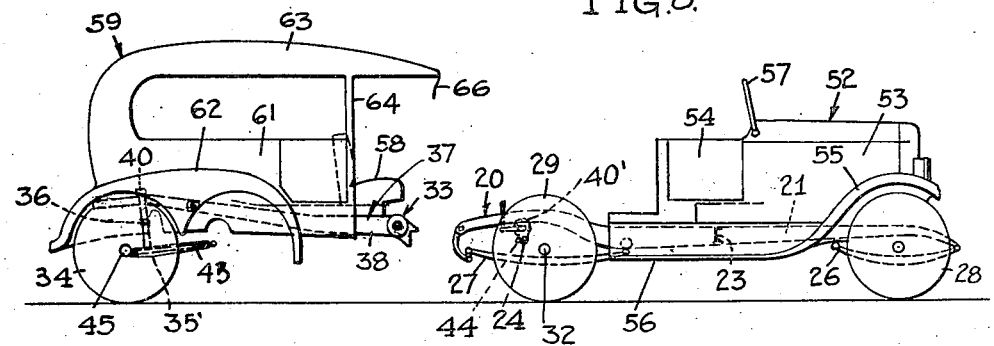
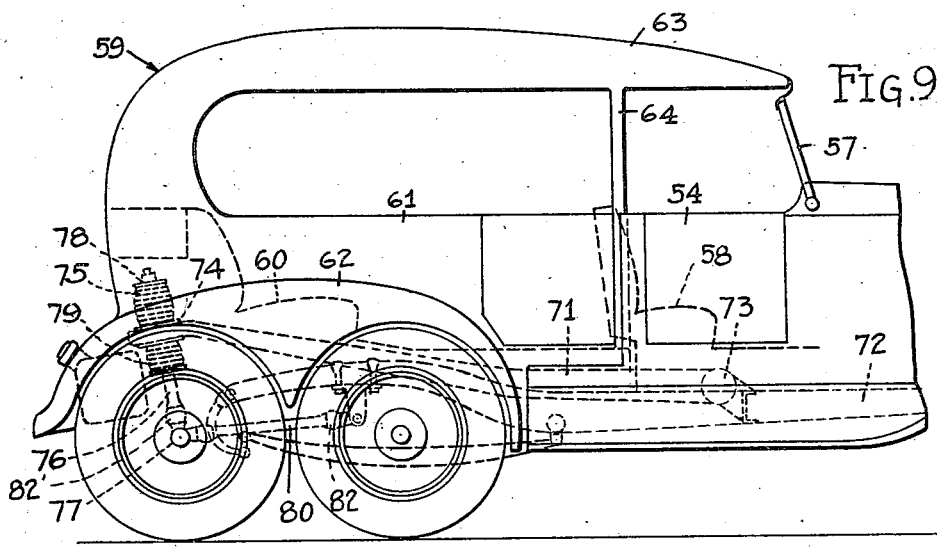
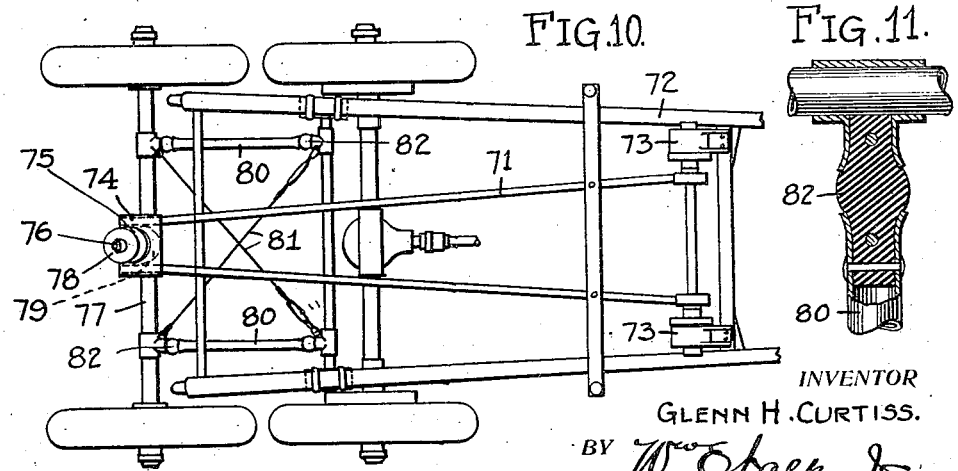
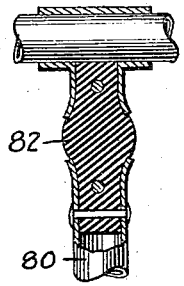
INVENTOR
GLENN H. CURTISS.
BY
ATTORNEY Patented Aug. 28, 1928.

1,682,324

UNITED STATES PATENT OFFICE.

GLENN H. CURTISS, OF HIALEAH, FLORIDA.

AUTOMOTIVE VEHICLE.

Application filed August 8, 1925. Serial No. 48,922.

My invention relates to road vehicles and has reference more particularly to such automotive vehicles as automobiles.

An automobile, under existing practices, may be said to include as indispensable parts, a body structure and a supporting and propelling chassis. Usually the chassis comprises, in addition to the power plant and its accessories, an essentially rigid chassis frame, suitable power transmission mechanism, front and rear wheels, and appropriate springs upon which the chassis frame is supported. The body, regardless of type, is generally built as a unit structure, is rigidly fastened to and upon the chassis frame, and for the effective absorption of such road shocks as reach the axles, is dependent upon the front and rear springs, of which there are usually four, two front and two rear.

Under ordinary good road operating conditions, an automobile body, suspended or supported in the manner indicated, gives excellent riding comfort. Under contrary conditions, however, the conventional spring arrangement is less satisfactory. When rough and undulating road beds are required to be traversed, the occupant or occupants of the vehicle, and especially the occupant or occupants of the rear seat or seats, instead of riding in comfort, are jolted and jostled about in a most objectionable manner; in fact, so much so that riding becomes irksome, tiresome and uncomfortable in the extreme.

An object of the present invention is to improve very materially the riding qualities of the automobile, and especially is it intended that the comfort and pleasure of riding, when occupying the rear seat or seats, shall be greatly improved. The body of the vehicle (and the invention is especially concerned with the passenger type automobile) unlike existing bodies, is transversely divided. Accordingly, in lieu of a longitudinally continuous or unit body structure, a forward body portion and a rear body portion are provided. The forward body portion is directly mounted upon a chassis frame, in all essential respects exactly similar to the conventional type chassis frame now generally used or employed. The rear body portion, within which both the front and rear seat or seats are contained, is, however, differently supported. A secondary chassis frame, in the nature of a chassis frame extension, pivoted to the primary or conventional type chassis frame, constitutes its support. Said secondary chassis frame, at its forward end, is fastened to and supported (the points of support being laterally spaced, and two in number) by the primary chassis. At its opposite end it, the secondary chassis frame, is extended or projected rearwardly well beyond the corresponding end of the primary chassis; such extended end being independently yieldingly supported (but a single point of support being provided at said end). Intermediately of its ends, the secondary chassis, is yieldingly fastened to the primary chassis by means of an appropriate shock absorber so organized and arranged as to yieldingly resist all relative movement between the two frames. Thus supported, the rear body portion is adapted to yield independently of the forward body portion, and since its points of support, three in number, two forward and one rear, are all resilient, with the latter, i. e., the single rear support, exceptionally flexible, the riding comfort experienced by the occupant or occupants of the seat or seats is very materially improved. Moreover, in using or providing but a single point of support or suspension for the rear end of said body portion, all ordinary laterally directed riding shocks are more completely dissipated and absorbed.

The forward connection between the primary chassis and the secondary chassis frame is also especially novel. The dual, said connection is yielding in all directions. It is shown as comprising a cross-bar at the forward end of the secondary chassis frame and laterally spaced anchorages mounted, one at each side of the primary chassis. Said anchorages are preferably rigidly fastened to said primary chassis at points intermediately of its ends and in the preferred embodiment of the invention, said anchorages are so related to the rod ends as to offer at all times, and under all operating conditions, a predetermined yielding restraint upon said rod, and hence the secondary chassis frame, in all directions of motion. Thus characterized, said connection, yielding as it is, adds very materially to the riding qualities of the vehicle by effectively absorbing all vibrational, inertia and other minor or incidental shocks.

A still further characteristic of the invention is the provision of a divided body structure in which the respective body portions are relatively movable, and in which the exterior body lines are so formed and related as to longitudinally merge and present, in appearance at least, a longitudinally continuous or unit body structure.

Other objects, advantages and improved results will be hereinafter set forth.

In the drawings, wherein like reference characters denote like or corresponding parts, Fig. 1 is a plan view of the complete machine;

Fig. 2 is a side elevation;

Fig. 8 is a more or less diagrammatic view (in side elevation) of the complete machine showing the forward and rear sections thereof wholly detached;

Fig. 9 is a side elevation of a slightly modified type machine;

Fig. 10 is a plan view of the secondary chassis and a portion of the primary chassis of said modification, and Fig. 11 is a detail view of one of the yielding connections employed in the construction of such modified type machine.

Figure 3:
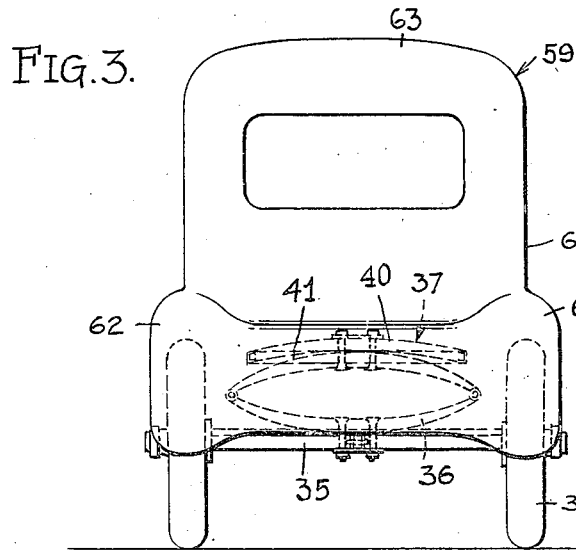
Fig. 3 is a rear end elevation.
Figure 4:
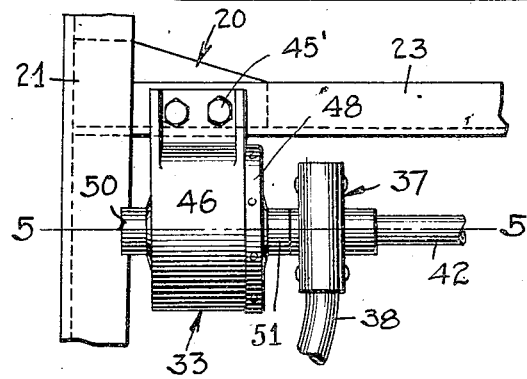
Fig. 4 is a plan view, somewhat enlarged, of the yielding connection between the primary and the secondary chassis.
Figure 7:
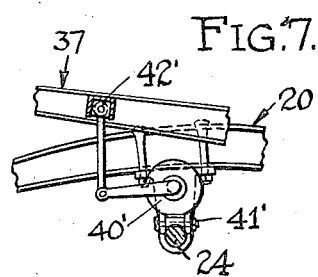
Fig. 7 is a side elevation of the intermediately located shock absorbers.
Figure 5:
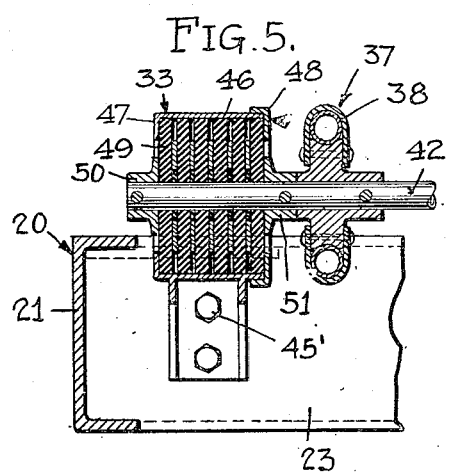
Fig. 5 is a section on the line 5—5 of Fig. 4.
Figure 6:
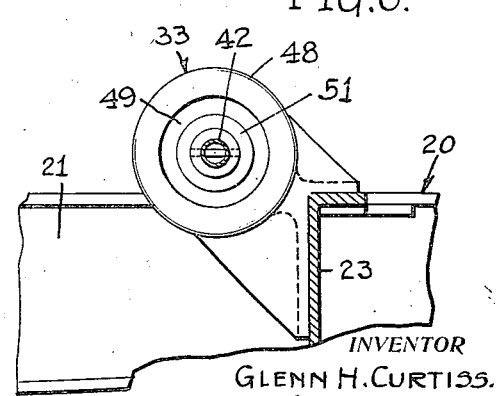
Fig. 6 is an end view of said connection.

In the embodiment of the invention selected for illustration, I have provided what I shall hereinafter designate a primary chassis and a secondary chassis. The primary chassis is of more or less conventional design. It comprises a chassis frame 20 having its longitudinal or side frame members 21 cross-braced forwardly as at 22, intermediately as at 23, and rearwardly as at 24 and 25. Said frame 20, at its forward end, is yieldingly supported by front springs 26 and at its rear end it is similarly supported by rear springs 27. These springs, four in number, two front and two rear, provide a four point suspension for the primary chassis frame. The running gear for the primary chassis includes front or steering wheels 28 and rear or driving wheels 29. The front wheels 28 are mounted on a front axle 30 and are appropriately connected with the steering mechanism, only the steering wheel 31 of which is shown. The rear wheels 29 are mounted on a rear axle 32 and are adapted to be driven thru appropriate power transmission mechanism by the motor or power plant (not shown). Except for anchorages 33, mounted on the cross-brace 23 of the primary chassis frame, the primary chassis is exactly similar to the ordinary automobile chassis now generally used.

The secondary chassis, unlike the primary chassis, is provided with but a single pair of road or supporting wheels. These wheels, designated as 34, together with an axle 35 and a transverse full elliptic spring 36, yieldingly support the rear end of the secondary chassis frame. Said frame, at its forward end, is directly supported upon the primary chassis. Like the frame 20, said secondary chassis frame 37 is substantially rigid throughout and comprises side frame members 38, cross-braced as at 39, 40 and 41. It also includes as a structural element, a cross-rod 42. The rod 42 is preferably disposed at the extreme forward end of said secondary chassis frame and is fastened or imbedded at its opposite ends within the anchorages 33. Thus fastened, said rod 42 defines a pivot axis about which the secondary chassis frame is adapted to rotate or swing. Preferably said frame 37 is narrower than the frame 20 to fit between its sides.

Throughout the greater portion of its length the secondary frame 37 overlaps the primary chassis frame 20. Its two-point connection with the primary chassis is approximately midway the ends of the primary chassis frame. From said point of attachment or connection said secondary chassis frame extends rearwardly to a point well beyond the rear end of the primary chassis frame. It is beneath such extended or projecting portion of the frame 37 that the spring 36 is mounted. Said spring 36, in the preferred form of the invention, is positioned forwardly of the rear axle 35. It is fastened at the top to the rear cross-frame member 40 of the secondary chassis and at the bottom is is fastened to a fore and aft rod 35' extending between said rear axle 35 and the cross-frame member 24 of the primary chassis. Thus positioned a portion of the load that would otherwise be carried by the axle 35 and wheels 34 is borne by the rear or driving wheels 29 of the primary chassis. Such as arrangement is further conducive to the proper suspension of the secondary frame in that road shocks and jolts are to a large extent completely washed out by the springs 27 before reaching the frame 37 of the secondary chassis.

To brace, and at the same time hold the axle 35 in parallelism with the rear axle 32 of the primary chassis, reach rods 43 are provided. These rods, two in number, are pivotally fastened as at 44 to the cross-member 24 of the primary chassis frame. From the pivot point 44, common to both rods, said rods 43 diverge rearwardly. At their opposite ends said rods 43 are pivotally fastened as at 45 to the axle 35, the points of attachment being widely spaced, one adjacent each end of said axle. Said rods 43 not only hold the axle 34 in parallelism with the axle 32, but in addition they brace said axle 35 both laterally and longitudinally, they interfere in no way with its yielding vertical movement, and they, in bracing said axle, cause the wheels 34 of the secondary chassis to track immediately behind and in proper longitudinal alignment with the rear or driving wheels 29 of the machine when traveling forward.

The secondary chassis frame, as intimated is movable in all directions relatively to the primary chassis. Such movement is both yielding and restricted. The anchorages 33, spaced as they are, provide at the forward end of the secondary chassis, two points of yielding support. The spring 36 provides at the rear end of said frame but a single point of yielding support. Collectively, a three-point support, yielding at all of its several points, is provided. Such a support, in effect triangular, is, for obvious reasons, desirable. In laterally spacing the two forward points of support, and in so constructing the anchorages 33 as to admit of slight yielding movement of the frame 37 in all directions or motion, all vibrational, inertia and other minor shocks, which would otherwise be directly carried to said frame, are effectively absorbed and dissipated at said anchorages, and the frame 37 is at the same time yieldingly held, under all operating conditions, substantially parallel to the road bed. Shocks tending to vertically displace the rear end of the frame 37 are effectively absorbed by the spring 36. Shocks tending to displace the forward end of the frame 37 are absorbed for the major part by the front and rear springs of the primary chassis upon which the forward end of said frame is directly tho yieldingly supported and at the same time, to a lesser, tho important degree, by the yielding anchorages 33. In other words, not only are the springs 26 and 27 upon which the primary chassis frame is directly mounted at all times effective, but in addition thereto, the spring 36 and the anchorages 33 (the latter in conjunction with said springs 36 and 37) contribute very materially to the effective absorption and dissipation of all ordinary and most of the extraordinary road shocks, even tho rough or undulating road beds are at the time being traversed.

To dampen and at the same time yieldingly resist all relative movement of the secondary chassis frame, there is provided, at a point intermediately of its ends, a shock absorber 40'. Preferably the shock absorber 40' is of the well known hydraulic type. It is fastened to the primary chassis frame as at 41' and to the secondary chassis frame as at 42'. The points of attachment being, in each instance, disposed substantially equi-distant from the sides of the respective frames. In actual practice it has been found that the use of a shock absorber or a snubber at the point mentioned, tends to lessen the vibrations of the secondary chassis frame and thru its damping effect, add greatly to the ease and comfort of riding.

In obtaining the forward yielding connection between the secondary chassis frame and the primary chassis frame, two anchorages 33 of identical construction are employed. One of said anchorages is fastened to the primary chassis frame 20 adjacent to one side thereof, whereas the other of said anchorages is fastened to said frame adjacent to its opposite side. Both said anchorages are bolted to said frame as indicated at 45'. Each anchorage includes a substantially cylindrical open end casing 46 having one of its open ends partly closed by an inturned annular flange 47. Said flange 47 in conjunction with a removable cap 48 partly closing the opposite open end of said casing, provides a retaining means for a plurality of annular rubber discs 49 enclosed within and substantially filling said casing. These discs, held as they are within said casing, provide yielding anchorages within which the ends of the rod 42 are imbedded. Said rod at its two ends passes thru the open casing and is laterally anchored to the rubber discs by collars 50 and 51. The collars, four in number, two for each rod end, are rigidly fastened upon the rod and bear directly against the exposed sides of the rubber discs. Thus anchoraged, the rod 42, and hence the secondary chassis frame 37 of which the rod 42 forms a part, while capable of movement in all directions, is yieldingly and elastically restrained in such movement; the discs 49 exerting at all times a predetermined elastic restraining force directly opposed to any and all movement of said rod.

In describing the body structure, as distinguished from its supporting chassis, attention is directed to the fact that while a passenger type body structure is shown, a different type body structure, if desired, may be equally as well employed. The passenger type body structure illustrated, instead of being a unit or longitudinally continuous body structure, is transversely divided intermediately of its ends. Two separate body structures, a forward body structure and a rear body structure, are thus provided. The forward body structure, designated in its entirety as 52, is directly mounted upon the primary chassis frame 20, and includes, among other parts, a motor hood and cowl 53, side doors 54, front fenders 55, side running boards 56, and an appropriate windshield 57. The rear body structure, designated in its entirety as 59, tho its exterior body lines merge longitudinally into the exterior body lines of the forward body structure, is constructed nevertheless as a separate body unit (see Fig. 8). It, said rear body structure, includes in addition to the front seat or seats 58 and the rear seat or seats 60, side extensions 61, rear fenders 62, a body top 63 extending forwardly over the steering wheel 31, and uprights 64, the latter, as illustrated in Fig. 2, being extended between the side extensions 61 and the body top. If desired, the uprights 64 may be joined beneath the rear body structure as indicated at 65. By means of a flexible strip 66, fastened to the windshield 57 and to the body top 63, said two body structures are sealed against the weather at this point and may be similarly sealed at other points. The rear body structure is directly mounted upon the secondary chassis frame 37. Moreover, the fenders 62 carried by and movable with said rear body structure, have a length sufficient to span and shield the longitudinally aligned rear wheels 29 and 34 at opposite sides of the machine.

A body structure characterized as above set forth, tho in appearance conventional, comprises relatively movable parts. Its rear end portion is mounted directly upon and is movable with the secondary chassis frame. Its front end portion is mounted directly upon and is movable with the primary chassis frame. Occupants of the front seat or seats are accorded a slightly greater degree of comfort than is ordinarily obtained where a conventional type chassis is employed. Occupants of the rear seat or seats are accorded an even greater degree of riding comfort. Not only is the rear body portion yieldingly supported in part by the springs of the primary chassis, but it is in addition supported by the spring 36 and the yielding connections or anchorages 33. Thus supported, plus the advantage gained by the use of the hydraulic shock absorber, an exceptionally easy riding and comfortable vehicle is produced.

To avoid or eliminate any tendency that might exist for the wheels 34 to swing out of proper alignment with the wheels 29 in backing, an operating lever 66' is provided. Said lever is mounted in convenient proximity to the driver's seat. By means of a cable 67 it (said lever) is connected to an arm 68 mounted on a transverse shaft 69. Said shaft 69 extends across the primary chassis frame at or near its rear end and carries at or near each end an arm 68' each of which is in turn connected to the rear axle 35 by a cable 70, normally equally slack. By operating the lever 66', the arm 68 and the arms 68' are moved, the cables 70 are drawn taut, and a more or less rigid axle connection is provided, thus preventing the axle 35 from swinging out of proper alignment with the axle 32 in backing.

In the modification of Figs. 8 and 9, a somewhat different type of secondary chassis is disclosed. The frame 71 of said secondary chassis is fastened to the primary chassis frame 72 by yielding anchorages 73. In this respect the modified form of the invention and the preferred form of the invention are the same. From its point of connection with the primary chassis, the frame 71 converges rearwardly to a point of termination behind the corresponding end of the primary chassis frame. At its extreme rear end the frame 71 is provided with a cross-head 74. Above and below this cross-head, and in bearing contact with its top and under surfaces, are grouped a plurality of shock absorber discs (rubber) 75, the discs in each group (top and bottom) being arranged in superimposed tiers. Thru the total number of discs 75 a substantially vertical rod 76 is extended. Said rod at its lower end is fastened to the axle 77 of the secondary chassis and at its opposite end it is provided with a bearing plate 78 against which the upper tier of rubber discs directly bear. Said plate 78, together with a plate 79, mounted on said rod 76 below the frame 71, holds the discs 75 in place. Collectively the discs 75 supplant the spring 36 of the preferred form of the invention. Not only do said discs yieldingly support the frame 71 above the axle 77, but thru the duplication (top and bottom), they absorb and dissipate both direct and rebound shocks.

The axle 77 is held in position by braces 80 fastened respectively to the primary chassis frame and to said axle. The braces 80 are preferably parallel and are fastened to the axle at or near its opposite ends. Proper elastically restrained rigidity between the rear axle of the primary chassis and the axle 77 is obtained by the use of cross-arranged wires 81 and the provision, in each brace, as a further shock absorbing means, of localized elastic portions in the form of one or more rubber inserts 82 as shown in Fig. 10. The rod 76 also equipped with an elastic insert 82' where it is connected to the axle 77 to give it the necessary restrained freedom of angular movement with respect thereto. Thus organized, a one-point support for the rear end of the secondary chassis frame, employing rubber discs instead of a spring, is provided. If desired, the forward seat or seats, instead of being mounted upon the secondary chassis frame, may be directly supported by the primary chassis.

It should be noted in conclusion that the connection between the primary chassis and the secondary chassis frame, tho yielding and pivoted, is nevertheless absolutely noiseless. In using rubber or its equivalent wherever possible, squeaks and rattles are avoided and a molecularly yielding rather than a mechanically yielding point or connection is obtained. Such a connection is further desirable in that no lubricant, in the absence of frictionally engaging parts, is under any circumstances required.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The combination, in a road vehicle, of a primary chassis, a secondary chassis including a chassis frame having three points of support, said points of support being substantially triangularly arranged, two forward and one behind, the two forward points of support being yieldable and disposed respectively at opposite sides of the longitudinal center line of said frame, and the single rear point of support being also yieldable and disposed in the longitudinal vertical plane of said center line.

2. The combination, in a road vehicle, of a primary chassis, a secondary chassis including a chassis frame having but three points of support, said points of support being substantially triangularly arranged, two forward and one behind, the two forward points of support being yieldable in all directions and disposed respectively at opposite sides of the longitudinal center line of said frame, and the single rear point of support being also yieldable and disposed in the longitudinal vertical plane of said center line.

3. The combination, in a road vehicle, of a primary chassis, a secondary chassis including a chassis frame having but three points of support, said points of support being substantially triangularly arranged, two forward and one behind, the two forward points of support being embedded in rubber to yield in all directions and being disposed respectively at opposite sides of the longitudinal center line of said frame, and said single rear point of support being also yieldable and disposed in the longitudinal vertical plane of said center line.

4. The combination, in a road vehicle, of a primary chassis including a forward axle and a rear axle, a secondary chassis including a chassis frame yieldingly supported at its forward end upon said primary chassis at a point well forward of said rear axle, a third axle mounted behind the rear axle of said primary chassis, a longitudinal continuous axle frame extending between and pivotally fastened at its opposite ends to said primary chassis and said third axle, and a yielding support for the rear end of said secondary chassis frame mounted upon said axle frame, forward of said third axle.

5. The combination, in a road vehicle, of a primary chassis including a forward axle and a rear axle, a secondary chassis including a chassis frame supported at its forward end upon said primary chassis and extended at its rear end beyond said rear axle, a third axle mounted beneath the extended end of said secondary chassis frame, an axle frame extended between said primary chassis and said third axle, and a yielding support for the extended end of said chassis frame bearing thereon in substantially the longitudinal vertical plane of its longitudinal center line.

6. The combination, in a road vehicle, of a primary chassis including a forward axle and a rear axle, a secondary chassis including a chassis frame supported at its forward end upon said primary chassis and extended at its rear end beyond said rear axle, a third axle mounted beneath the extended end of said frame, an axle frame extending between said primary chassis and said third axle, and a transversely extending yielding support for the extended end of said chassis frame mounted upon said axle frame and bearing against said chassis frame in substantially the longitudinal vertical plane of its longitudinal center line.

7. The combination, in a road vehicle, of a primary chassis including a front axle and a rear axle, a secondary chassis including a chassis frame having two forward points of support, said two points of support being disposed respectively at opposite sides of the longitudinal center line of said frame, and said chassis frame at its rear end being extended rearwardly beyond said rear axle, a third axle mounted beneath the extended end of said frame, an axle frame extending between said primary chassis and said third axle, and a third support for said chassis frame mounted on said axle frame intermediately of its ends and bearing on said chassis frame in substantially the longitudinal vertical plane of its longitudinal center line.

8. The combination, in a road vehicle, of a primary chassis, including a front and rear axle, a secondary chassis including a chassis frame supported at its forward end upon said primary chassis, the points of support at said forward end being yieldable in all directions and disposed respectively at opposite sides of the longitudinal vertical plane of the longitudinal center line of said frame, a third axle mounted behind the rear axle of said primary chassis, an axle frame extending between said primary chassis and said third axle, and a yielding support for the rear end of said chassis frame mounted upon said axle frame and bearing on said chassis frame in the longitudinal vertical plane of said center line.

9. The combination, in a road vehicle, of a primary chassis, including a front axle and a rear axle, a secondary chassis including a chassis frame having three points of support, said points of support being substantially triangularly arranged, two forward and one beind, the two forward points of support being rubber embedded to yield in all directions and being disposed respectively at opposite sides of the longitudinal center line of said frame, and the single rear point of support being also yieldable and so related to said chassis frame as to bear thereon in the longitudinal vertical plane of said center line, a third axle mounted behind said rear axle and beneath said single rear point of support, and an axle frame extending between said primary chassis and said third axle, said axle frame having a pivotal connection with said primary chassis and said third axle at its opposite ends.

In testimony whereof I hereunto affix my signature.

GLENN H. CURTISS.